US011072363B2

United States Patent
Toko et al.

(10) Patent No.: US 11,072,363 B2
(45) Date of Patent: Jul. 27, 2021

(54) CONTROL SYSTEM FOR MOTOR AND CONTROL DEVICE FOR MOTOR

(71) Applicant: JTEKT CORPORATION, Osaka (JP)

(72) Inventors: Takahiro Toko, Takahama (JP); Ryo Irie, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/848,890

(22) Filed: Apr. 15, 2020

(65) Prior Publication Data

US 2020/0331517 A1    Oct. 22, 2020

(30) Foreign Application Priority Data

Apr. 19, 2019 (JP) .............................. JP2019-080175

(51) Int. Cl.
  *B62D 5/00* (2006.01)
  *H02P 27/00* (2006.01)
  *B62D 5/04* (2006.01)
  *H02P 27/06* (2006.01)
  *H02P 29/028* (2016.01)

(52) U.S. Cl.
  CPC ............ *B62D 5/046* (2013.01); *B62D 5/0493* (2013.01); *H02P 27/06* (2013.01); *H02P 29/028* (2013.01)

(58) Field of Classification Search
  None
  See application file for complete search history.

(56) References Cited

U.S. PATENT DOCUMENTS

| 2004/0107781 A1* | 6/2004 | Asaumi | G01L 3/102 73/862.333 |
| 2013/0145865 A1* | 6/2013 | Aoki | G01L 3/105 73/862.193 |
| 2017/0272009 A1* | 9/2017 | Kawamura | B60L 3/12 |
| 2018/0043928 A1 | 2/2018 | Fujita et al. | |
| 2018/0086366 A1 | 3/2018 | Kodera | |
| 2020/0083797 A1* | 3/2020 | Saijo | H02P 6/10 |

FOREIGN PATENT DOCUMENTS

| EP | 1 426 266 A2 | 6/2004 |
| JP | 2018-024335 A | 2/2018 |

OTHER PUBLICATIONS

Sep. 11, 2020 Extended Search Report issued in European Patent Application No. 20169835.4.

* cited by examiner

*Primary Examiner* — Bentsu Ro
(74) *Attorney, Agent, or Firm* — Oliff PLC

(57) ABSTRACT

A control system for a motor includes: a first processing circuit configured to operate a first drive circuit; a second processing circuit configured to operate a second drive circuit; and a command circuit configured to output a signal relating to a command value for a steered angle of a steered wheel to the first processing circuit and the second processing circuit. The command circuit is configured to execute a detection process, a first notification process, and a second notification process. The first processing circuit is configured to execute a first correction process based on a first result signal to control the steered angle to the command value. The second processing circuit is configured to execute a second correction process based on a second result signal to control the steered angle to the command value.

6 Claims, 4 Drawing Sheets

CONTROL SYSTEM FOR MOTOR AND CONTROL DEVICE FOR MOTOR

CROSS-REFERENCE TO RELATED APPLICATION

This application claims priority to Japanese Patent Application No. 2019-080175 filed on Apr. 19, 2019, incorporated herein by reference in its entirety.

BACKGROUND

1. Technical Field

The disclosure relates to control systems for motors and control devices for motors.

2. Description of Related Art

For example, Unexamined Japanese Patent Application Publication No. 2018-24335 (JP 2018-24335 A) describes a motor that steers steered wheels and that includes two stator coils independent of each other. JP 2018-24335 A describes, as a control device for the motor that operates drive circuits connected to the stator coils, a redundant control device including a separate microcomputer for each stator coil. Each of the pair of microcomputers controls d- and q-axis currents of the motor by calculating the d- and q-axis currents based on the detection values of separate rotation angle sensors. JP 2018-24335 A also describes that a command value for the current of the first microcomputer is used by the second microcomputer (FIG. 10).

SUMMARY

The inventors studied to detect the steered angle of steered wheels by the rotation angle sensors and perform feedback control to feed back the detected values to a target value in the redundant control device as described above. In this case, however, controllability of the steered angle may decrease due to the difference between the detection values of the rotation angle sensors.

A first aspect of the disclosure is a control system for a motor. The motor is configured to steer a steered wheel and includes a first stator coil and a second stator coil that are insulated from each other. The control system includes: a first processing circuit configured to operate a first drive circuit connected to the first stator coil; a second processing circuit configured to operate a second drive circuit connected to the second stator coil; and a command circuit configured to output a signal relating to a command value for a steered angle of the steered wheel to the first processing circuit and the second processing circuit. The command circuit is configured to execute a detection process, a first notification process, and a second notification process. The detection process is configured to detect, based on a traveling state of a vehicle, when the steered angle becomes a reference angle. The first notification process is configured to output a first result signal, which is a signal based on a detection result of the detection process, to the first processing circuit. The second notification process is configured to output a second result signal, which is a signal based on the detection result of the detection process, to the second processing circuit. The first processing circuit is configured to execute a first correction process based on the first result signal to control the steered angle to the command value. The first correction process is a process of correcting a relative angle between a first convertible angle, which is a convertible angle that is convertible to the steered angle of the steered wheel, and a convertible angle according to the command value to input the corrected relative angle to operate the first drive circuit. The first convertible angle is an angle based on a detection value of a first angle sensor. The second processing circuit is configured to execute a second correction process based on the second result signal to control the steered angle to the command value. The second correction process is a process of correcting a relative angle between a second convertible angle, and the convertible angle according to the command value to input the corrected relative angle to operate the second drive circuit. The second convertible angle is an angle based on a detection value of a second angle sensor.

With the above configuration, the command circuit outputs the first result signal to the first processing circuit. The first processing circuit therefore obtains the first convertible angle corresponding to the reference angle. The first convertible angle can thus be corrected to control the relative angle between the first convertible angle corresponding to the reference angle and an actual first convertible angle according to the relative angle between the reference angle and the command value. In the above configuration, the second result signal is output to the second processing circuit. The second processing circuit therefore obtains the second convertible angle corresponding to the reference angle. The second convertible angle can thus be corrected to control the relative angle between the second convertible angle corresponding to the reference angle and an actual second convertible angle according to the relative angle between the reference angle and the command value. The correction amount for the first convertible angle and the correction amount for the second convertible angle can thus be set independently. Accordingly, even when there is a difference between the detection value of the first angle sensor and the detection value of the second angle sensor, the first convertible angle and the second convertible angle are accurately corrected. The steered angle is therefore controlled accurately.

In the above control system, the first processing circuit may be configured to execute a first output process and a first comparison output process, the first output process being a process of outputting the first convertible angle to the command circuit, the first comparison output process being a process of outputting a reference first angle to the command circuit, and the reference first angle being a value when the first convertible angle output by the first output process based on the first result signal indicates the reference angle. The second processing circuit may be configured to execute a second output process and a second comparison output process, the second output process being a process of outputting the second convertible angle to the command circuit, the second comparison output process being a process of outputting a reference second angle to the command circuit, and the reference second angle being a value when the second convertible angle output by the second output process based on the second result signal indicates the reference angle. The command circuit may be configured to execute a first comparison process and a second comparison process, the first comparison process being a process of checking whether or not the value when the first convertible angle output by the first output process, which is obtained based on the detection process, indicates the reference angle matches the reference first angle output by the first comparison output process, and the second comparison process being a process of checking whether or not the value when the second convertible angle output by the second output process, which is obtained based on the detection process, indicates the reference angle matches the reference second angle output by the second comparison output process.

With the above configuration, the command circuit can obtain the first convertible angle corresponding to the reference angle by using the first output process and the detection process, and can obtain the second convertible angle corresponding to the reference angle by using the second output process and the detection process. As the first processing circuit executes the first comparison output process, the command circuit can check whether or not the reference first angle obtained by the first processing circuit matches the first convertible angle corresponding to the reference angle obtained by the command circuit. As the second processing circuit executes the second comparison output process, the command circuit can check whether or not the reference second angle obtained by the second processing circuit matches the second convertible angle corresponding to the reference angle obtained by the command circuit.

In the above control system, the first notification process may include a process of outputting, as the first result signal, to the first processing circuit a signal relating to the first convertible angle when the steered angle becoming the reference angle is detected by the detection process based on the first convertible angle output by the first output process. The first comparison output process may include a process of outputting as the reference first angle the first convertible angle notified by the first notification process. The second notification process may include a process of outputting, as the second result signal, to the second processing circuit a signal relating to the second convertible angle when the steered angle becoming the reference angle is detected by the detection process based on the second convertible angle output by the second output process. The second comparison output process may include a process of outputting as the reference second angle the second convertible angle notified by the second notification process.

With the above configuration, the first processing circuit is notified of the first convertible angle corresponding to the reference angle obtained by the command circuit. The first processing circuit can therefore easily obtain the reference first angle. Moreover, the second processing circuit is notified of the second convertible angle corresponding to the reference angle obtained by the command circuit. The second processing circuit can therefore easily obtain the reference second angle.

In the above control system, the first processing circuit may be configured to execute a first manipulated variable calculation process of calculating a first manipulated variable based on an output value of an integral element according to a difference between the first convertible angle and a target angle according to the command value, a process of operating the first drive circuit based on the first manipulated variable, and a manipulated variable output process of outputting the first manipulated variable to the second processing circuit. The second processing circuit may be configured to execute a second manipulated variable calculation process of calculating a second manipulated variable, without using an integral element, according to a difference between the second convertible angle and the target angle, a first use and operation process of operating the second drive circuit based on the first manipulated variable, and a determination process of determining during the first use and operation process whether the first processing circuit is abnormal or not based on a deviation between the first manipulated variable and the second manipulated variable calculated by the second manipulated variable calculation process.

With the above configuration, both the first processing circuit and the second processing circuit can accurately obtain the reference angle and control the steered angle to the command value by the correction process. However, a relative angle between any rotation angle of the motor and the reference angle that is obtained by the first processing circuit and a relative angle between any rotation angle of the motor and the reference angle that is obtained by the second processing circuit may not always be the same due to distortion of a rotor etc. When the angle obtained by the first processing circuit is different from that obtained by the second processing circuit, the difference between the first convertible angle corrected by the first correction process and the target angle is different from that between the second convertible angle corrected by the second correction process and the target angle. In this case, when the second processing circuit controls the steered angle based on a manipulated variable calculated independently by the second processing circuit, control performed by the first processing circuit may not match control performed by the second processing circuit. In the above configuration, however, the second processing circuit controls the steered angle based on the first manipulated variable. Accordingly, the control performed by the first processing circuit matches the control performed by the second processing circuit control.

In the case where the second manipulated variable is calculated based on the output of the integral element according to the difference between the second convertible angle corrected by the second correction process and the target angle, an error between the first manipulated variable and the second manipulated variable may increase. In the above configuration, however, the second manipulated variable is calculated without using the integral element. Accordingly, when the control is being performed normally, the difference between the first and second manipulated variables is less likely to increase, and whether the control is being performed normally or not can be monitored by the determination process.

In the above control system, the second processing circuit may be configured to stop the first use and operation process and execute a second use and operation process of operating the second drive circuit based on the second manipulated variable, when it is determined in the determination process that the first processing circuit is abnormal.

With the above configuration, when the control is abnormal, the second processing circuit operates the second drive circuit based on the second manipulated variable. Controllability of the steered angle is less likely to decrease.

A second aspect of the disclosure is a control device for a motor. The motor is configured to steer a steered wheel and includes a first stator coil and a second stator coil which are isolated from each other. The control device includes: a first processing circuit configured to operate a first drive circuit connected to the first stator coil; and a second processing circuit configured to operate a second drive circuit connected to the second stator coil. The first processing circuit is configured to execute a first correction process based on a first result signal received from a command circuit to control a steered angle to a command value. The first result signal is a signal according to a result of detection of the steered angle becoming a reference angle that is performed based on a traveling state of a vehicle. The first correction process is a process of correcting a relative angle between a first convertible angle, which is a convertible angle that is convertible to the steered angle of the steered wheel, and a convertible angle according to the command value to input the corrected relative angle to operate the first drive circuit. The first convertible angle is an angle based on a detection value of a first angle sensor. The second processing circuit is configured to execute a second correction process based on a second result signal received from the command circuit to control the steered angle to the command value. The second result signal is a signal according to the result of detection of the steered angle becoming the reference angle that is performed based on the traveling state of the vehicle. The second correction process is a process of correcting a relative angle between a second convertible angle and the convertible angle according to the command value to input the corrected relative angle to operate the second drive circuit. The second convertible angle is an angle based on a detection value of a second angle sensor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
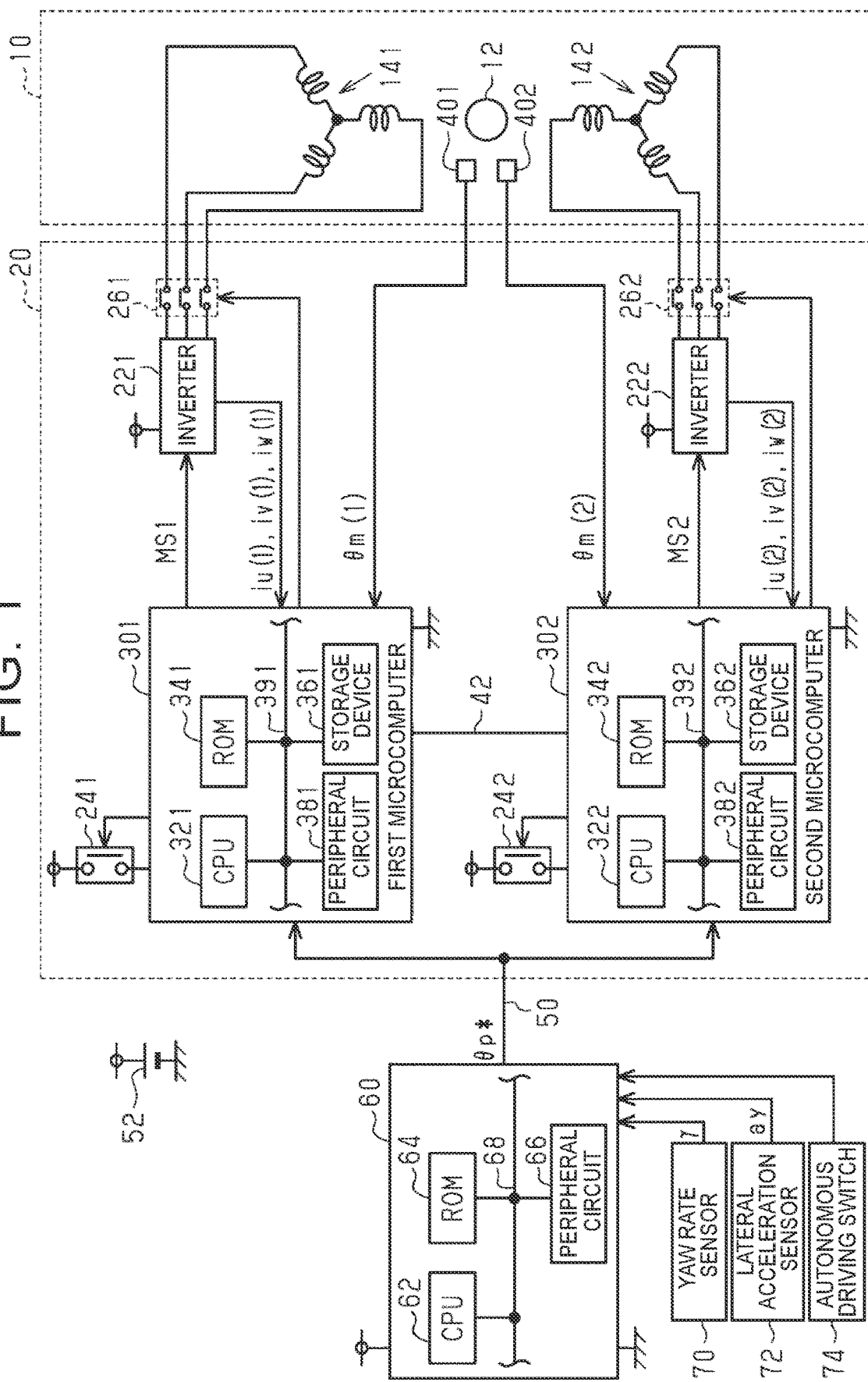
FIG. 1 illustrates a control system and a motor according to an embodiment.

An embodiment of a control system for a motor will be described with reference to the accompanying drawings. A motor 10 shown in FIG. 1 is a power source in a steering actuator for steering steered wheels. In the present embodiment, a surface permanent magnet synchronous motor (SPMSM) is illustrated as the motor 10. The motor 10 includes one rotor 12 and a pair of stator coils, namely a first stator coil 141 and a second stator coil 142. A control device 20 is a control device of which controlled object is the motor 10, and controls torque that is a controlled variable of the motor 10. The control device 20 includes separate circuits for the first stator coil 141 and the second stator coil 142. Specifically, the control device 20 includes a circuit for a first system and a circuit for a second system which correspond to the first stator coil 141 and the second stator coil 142, respectively.

More specifically, the control device 20 includes a first inverter 221 and a first microcomputer 301 as the circuit for the first system. The first inverter 221 is connected to the first stator coil 141. The first microcomputer 301 controls a current flowing through the first stator coil 141 by outputting an operation signal MS1 to the first inverter 221. The control device 20 includes a second inverter 222 and a second microcomputer 302 as the circuit for the second system. The second inverter 222 is connected to the second stator coil 142. The second microcomputer 302 controls a current flowing through the second stator coil 142 by outputting an operation signal MS2 to the second inverter 222. The first microcomputer 301 and the second microcomputer 302 can communicate with each other via a communication line 42.

Hereinafter, the letter "k" that can be either "1" or "2" is used to collectively describe the first system and the second system. For example, "k" is used as follows. "The kth inverter 22$k$ is connected to the kth stator coil 14$k$."

The kth microcomputer 30$k$ obtains a rotation angle θm(k) of the rotor 12 detected by a kth angle sensor 40$k$ and three-phase currents iu(k), iv(k), and iw(k) flowing through the kth stator coil 14$k$. Each current iu(k), iv(k), iw(k) is detected as, for example, a voltage drop in a corresponding shunt resistor connected to a corresponding leg of the kth inverter 22$k$.

The kth microcomputer 30$k$ includes a central processing unit (CPU) 32$k$, a read only memory (ROM) 34$k$, a storage device 36$k$, a peripheral circuit 38$k$, etc. The CPU 32$k$, the ROM 34$k$, the storage device 36$k$, the peripheral circuit 38$k$, etc. can communicate with each other via a local network 39$k$. The storage device 36$k$ is an electrically rewritable nonvolatile memory. The peripheral circuit 38$k$ includes a circuit for generating, based on an external clock signal, a clock signal that regulates an internal operation, a power supply circuit, a reset circuit, etc.

The control device 20 can communicate with an external upper electronic control unit (ECU) 60 via a communication line 50. A target angle θp* that is output from the upper ECU 60 is input to the first microcomputer 301 and the second microcomputer 302. The target angle θp* is a target value of a convertible angle that can be converted to a steered angle of the steered wheels (turning angle of tires). In the present embodiment, the target angle θp* is a target value of a rotation angle of a steering shaft. Specifically, the target angle θp* according to the present embodiment has a value "0" at a reference angle and has different signs on the right turn side and the left turn side. The reference angle is a straight travel angle that is an angle at which a vehicle travels straight. A terminal voltage of a battery 52 is applied to the upper ECU 60, the kth microcomputer 30$k$, and the kth inverter 22$k$. More specifically, a voltage of the battery 52 is applied to the kth microcomputer 30$k$ via a relay 24$k$. A relay 26$k$ is provided between the kth inverter 22$k$ and the kth stator coil 14$k$.

The upper ECU 60 includes a CPU 62, a ROM 64, and a peripheral circuit 66. The CPU 62, the ROM 64, and the peripheral circuit 66 can communicate with each other via a local network 68. The upper ECU 60 refers to various sensor values such as a yaw rate γ detected by a yaw rate sensor 70 and lateral acceleration may detected by a lateral acceleration sensor 72 in order to output the target angle θp*. An operation state signal of an autonomous driving switch 74 is input to the upper ECU 60. The autonomous driving switch 74 is a switch with which the driver sends an instruction to perform autonomous driving.

Figure 2:
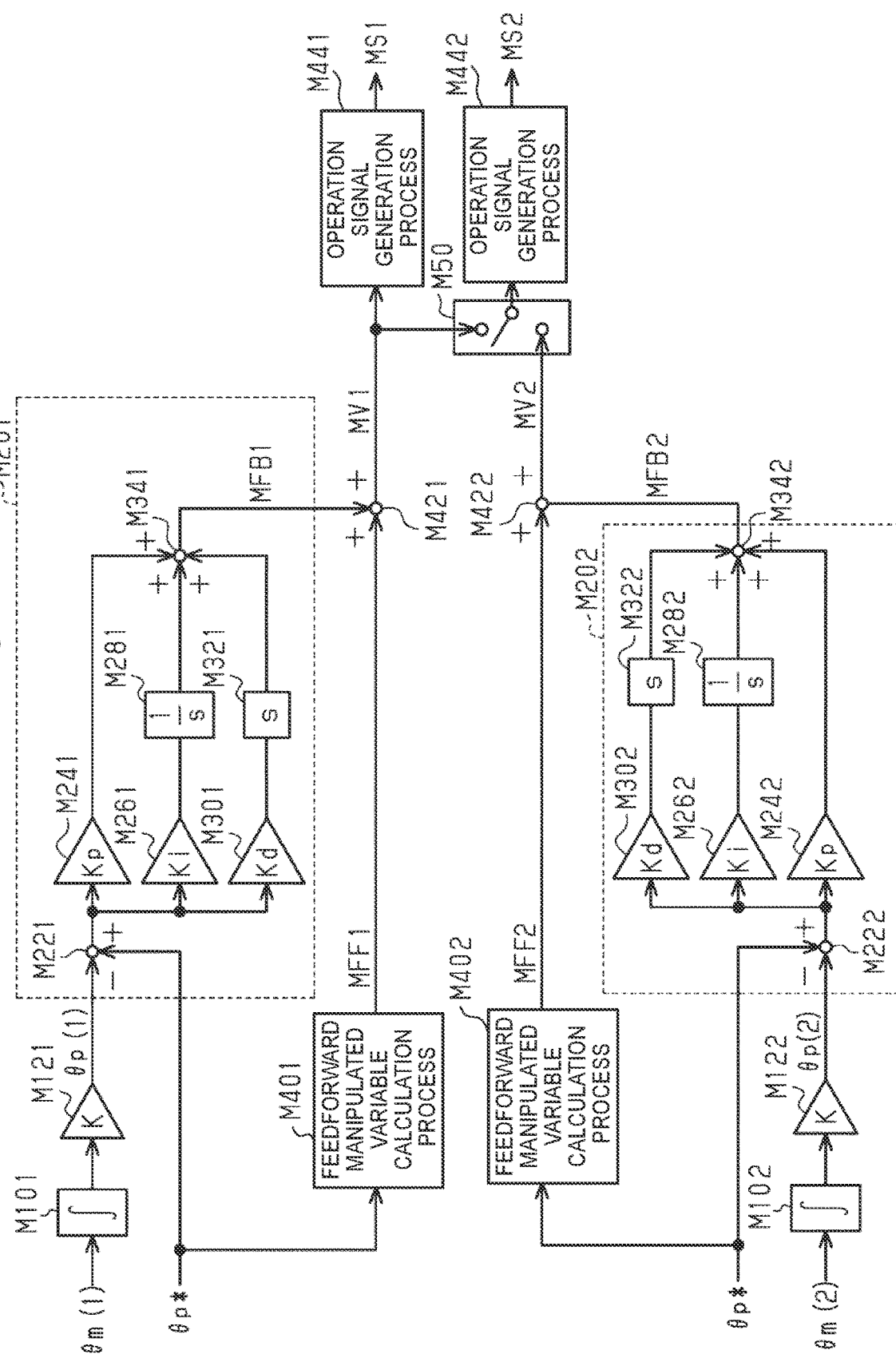
FIG. 2 illustrates a part of processes that are executed by a control device according to the embodiment.

FIG. 2 particularly illustrates processes that are executed when autonomous driving is performed out of processes that are executed by the first microcomputer 301 and the second microcomputer 302. The process illustrated in FIG. 2 is implemented by the CPU 32$k$ executing a program stored in the ROM 34$k$. Hereinafter, the processes that are executed by the first microcomputer 301 and the second microcomputer 302 are collectively denoted by reference signs that end with the letter "k."

An integration process M10$k$ is a process of integrating the rotation angle θm(k). A conversion process M12$k$ is a process of multiplying the output of the integration process M10$k$ by a predetermined coefficient K to convert this output to a rotation angle θp(k) of the steering shaft.

A feedback manipulated variable calculation process M20$k$ is a process of calculating a feedback manipulated variable MFBk. The feedback manipulated variable MFBk is a manipulated variable for performing feedback control to feed back the rotation angle θp(k) to the target angle θp*. In the present embodiment, the feedback manipulated variable MFBk is basically the sum of the output value of a proportional element, the output value of an integral element, and the output value of a differential element. Specifically, a deviation calculation process M22k is a process of calculating the difference between the rotation angle θp(k) and the target angle θp*, and a proportional element M24k is a process of multiplying the difference by a proportional coefficient Kp. An integral gain multiplication process M26k is a process of multiplying the difference by an integral gain Ki, and an integration process M28k is a process for updating an integrated value of the output of the integral gain multiplication process M26k and outputting the updated integrated value. An integral element is composed of the integral gain multiplication process M26k and the integration process M28k. A differential gain multiplication process M30k is a process of multiplying the difference by a differential gain Kd, and a differentiation process M32k is a process of differentiating the output of the differential gain multiplication process M30k. A differential element is composed of the differential gain multiplication process M30k and the differentiation process M32k. An addition process M34k is a process of calculating the sum of the output values of the proportional element M24k, the integration process M28k, and the differentiation process M32k and outputting the sum as the feedback manipulated variable MFBk.

A feedforward manipulated variable calculation process M40k is a process of calculating a feedforward manipulated variable MFFk. The feedforward manipulated variable MFFk is a manipulated variable for controlling to achieve the target angle θp*. Specifically, the feedforward manipulated variable calculation process M40k is a process of setting the absolute value of the feedforward manipulated variable MFFk to a larger value when the absolute value of the target angle θp* is larger than when the absolute value of the target angle θp* is smaller. This can be implemented by, for example, the CPU 32k calculating the feedforward manipulated variable MFFk by mapping with map data stored in advance in the ROM 34k. For example, an input variable for the map data is the target angle θp*, and an output variable for the map data is the feedforward manipulated variable MFFk. The map data is a set of discrete values of the input variable and values of the output variable corresponding to the values of the input variable. The calculation by mapping is a process in which, when the value of the input variable matches one of the values of the input variable in the map data, a corresponding value of the output variable in the map data is output as the calculation result, and when the value of the input variable does not match any of the values of the input variable in the map data, a value calculated by interpolation of a plurality of values of the output variable in the map data is output as the calculation result.

An addition process M42k is a process of adding the feedback manipulated variable MFBk and the feedforward manipulated variable MFFk to calculate a kth manipulated variable MVk. The kth manipulated variable MVk is a q-axis current command value.

A first operation signal generation process M441 is a process of calculating and outputting the operation signal MS1 for the first inverter 221 such that a q-axis current flowing through the first stator coil 141 becomes "½" of the first manipulated variable MV1.

A selection process M50 is a process of selectively outputting one of two manipulated variables, namely one of the first manipulated variable MV1 and the second manipulated variable MV2, to a second operation signal generation process M442.

The second operation signal generation process M442 is in principle a process of calculating and outputting the operation signal MS2 for the second inverter 222 such that a q-axis current flowing through the second stator coil 142 becomes "½" of the output of the selection process M50.

Figure 3:
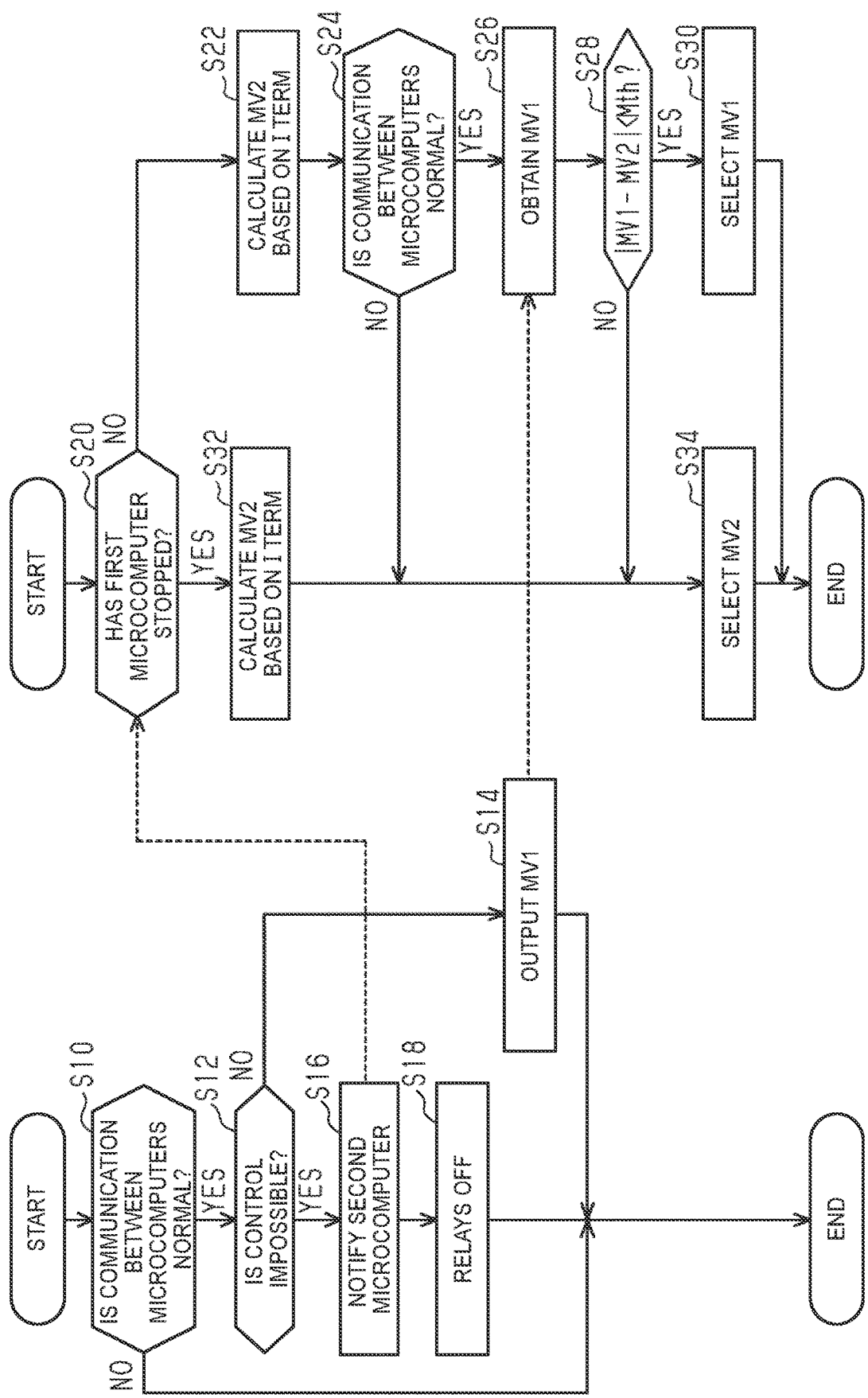
FIG. 3 is a flowchart illustrating processes that are executed by the control device.

In the present embodiment, the processes illustrated in FIG. 2 are changed as appropriate by executing processes illustrated in FIG. 3 based on the processes in FIG. 2. FIG. 3 illustrate a process that is implemented by the CPU 321 repeatedly executing a program stored in the ROM 341 at, for example, predetermined intervals and a process that is implemented by the CPU 322 repeatedly executing a program stored in the ROM 342 at, for example, predetermined intervals. The steps of each process in FIG. 3 are denoted by numbers that start with the letter "S." The processes in FIG. 3 will be described for each of situations.

In the series of processes illustrated in FIG. 3, the CPU 321 first determines whether or not communication between the first microcomputer 301 and the second microcomputer 302 is normal (S10). In this example, the first microcomputer 301 and the second microcomputer 302 periodically send and receive predetermined data to and from each other via the communication line 42, and the CPU 321 determines that communication between the first microcomputer 301 and the second microcomputer 302 is abnormal when the first microcomputer 301 and the second microcomputer 302 cannot periodically send and receive predetermined data to and from each other via the communication line 42.

When the CPU 321 determines that communication between the first microcomputer 301 and the second microcomputer 302 is normal (S10: YES), the CPU 321 determines whether or not the first microcomputer 301 cannot control a current flowing through the first stator coil 141 by operating the first inverter 221 (S12). The CPU 321 determines that the first microcomputer 301 cannot control a current flowing through the first stator coil 141 when the first angle sensor 401 is abnormal, when the temperature of the first stator coil 141 or the first inverter 221 is equal to or higher than a prescribed temperature, etc. For example, it is determined that the first angle sensor 401 is abnormal when an output signal of the first angle sensor 401 is fixed to a ground potential or a terminal potential of the battery 52, etc. Whether or not the temperature of the first stator coil 141 or the first inverter 221 is equal to or higher than the prescribed temperature is determined based on the history of the currents iu(1), iv(1), and iw(1), etc.

When the CPU 321 determines that the first microcomputer 301 can control a current flowing through the first stator coil 141 (S12: NO), the CPU 321 outputs the first manipulated variable MV1 to the second microcomputer 302 via the communication line 42. (S14). When the process of S14 is completed, the CPU 321 terminates the series of processes illustrated in FIG. 3.

As shown in FIG. 3, the CPU 322 determines whether or not the first microcomputer 301 has stopped controlling a current flowing through the first stator coil 141 (S20). When the first microcomputer 301 is operating (S20: NO), the CPU 322 stops the integration process M282 (S22). Specifically, the value held by the integration process M282 is fixed to an initial value "0." The feedback manipulated variable MFB2 is therefore the sum of the output value of the proportional element M242 and the output value of the differentiation process M322, and the second manipulated variable MV2 is the sum of the feedback manipulated variable MFB2 and the feedforward manipulated variable MFF2.

The CPU 322 then determines whether or not communication between the first microcomputer 301 and the second microcomputer 302 is normal (S24). When the CPU 322 determines that communication between the first microcomputer 301 and the second microcomputer 302 is normal (S24: YES), the CPU 322 obtains the first manipulated variable MV1 output by the process of S14 in FIG. 3 (S26). The CPU 322 then determines whether or not the absolute value of the difference between the first manipulated variable MV1 and the second manipulated variable MV2 is smaller than a prescribed value Mth (S28). This process is a process of determining whether or not the rotation angle θp(k) is normally being controlled to the target angle θp*. That is, the difference between the first manipulated variable MV1 and the second manipulated variable MV2 is the difference between the feedback manipulated variables MFB1, MFB2, and the difference between the feedback manipulated variables MFB1, MFB2 is supposed to be very small.

That is, a first factor that causes the difference between the feedback manipulated variable MFB1, MFB2 is that the output value of the integration process M282 is zero. Since the output value of the integration process M281 is a value that compensates for a control error caused by the feedforward manipulated variable MFF1, the absolute value of the output value of the integration process M281 does not become so large. A second factor that causes the difference between the feedback manipulated variables MFB1, MFB2 is the difference between the proportional elements M241, M242 and the difference between the differentiation processes M321, M322 due to the difference between the rotation angle θm(1) detected by the first angle sensor 401 and the rotation angle θm(2) detected by the second angle sensor 402. However, since the absolute value of the difference between the rotation angles θm(1), θm(2) is very small, the absolute value of the difference between the proportional elements M241, M242 and the absolute value of the difference between the differentiation processes M321, M322 are also small.

When the CPU 322 determines that the absolute value of the difference between the first manipulated variable MV1 and the second manipulated variable MV2 is smaller than the prescribed value Mth (S28: YES), it is considered that the control is being performed normally. The CPU 322 therefore selects the first manipulated variable MV1 as the selection process M50 (S30). Accordingly, in the second operation signal generation process M442, the operation signal MS2 for operating the second inverter 222 is generated and output such that a q-axis current flowing through the second stator coil 142 becomes "½" of the first manipulated variable MV1. When the process of S30 is completed, the CPU 322 terminates the series of processing illustrated in FIG. 3.

When communication between microcomputers is normal and the control of the first microcomputer 301 is abnormal, as shown in FIG. 3, since the CPU 321 determines in S12 that the first microcomputer 301 cannot control a current flowing through the first stator coil 141 (S12: YES), the CPU 321 notifies the second microcomputer 302 via the communication line 42 that the first microcomputer 301 cannot control a current flowing through the first stator coil 141 (S16). The CPU 321 switches the relays 241, 261 to an open state through the peripheral circuit 381 etc. (S18). When the process of S18 is completed, the CPU 321 terminates the series of processes illustrated in FIG. 3.

In this case, as shown in FIG. 3, the CPU 322 determines that the first microcomputer 301 has stopped controlling a current flowing through the first stator coil 141 (S20: YES), and performs the integration process M282 to calculate the second manipulated variable MV2 based on the integral element (I term) (S32).

The CPU 322 selects the second manipulated variable MV2 as the selection process M50 (S34). In this case, in the second operation signal generation process M442, the operation signal MS2 for operating the second inverter 222 is generated and output such that a q-axis current flowing through the second stator coil 142 becomes the second manipulated variable MV2. That is, since no current is applied to the first stator coil 141, a q-axis current that is applied to the second stator coil 142 needs to be the second manipulated variable MV2 in order to control the rotation angle θp(2) to the target angle θp*. When the process of S34 is completed, the CPU 322 terminates the series of processes illustrated in FIG. 3.

When communication between microcomputers is normal and the control is abnormal, it is assumed that the process of S14 in FIG. 3 is performed. In this case, in the process of S28 illustrated in FIG. 3, the CPU 322 determines that the absolute value of the difference between the first manipulated variable MV1 and the second manipulated variable MV2 is not smaller than the prescribed value Mth (S28: NO), and the routine proceeds to S34. In the second operation signal generation process M442, the operation signal MS2 for operating the second inverter 222 is generated and output such that a q-axis current flowing through the second stator coil 142 becomes "½" of the second manipulated variable MV2.

When communication between microcomputers is abnormal, as shown in FIG. 3, the CPU 321 determines that an abnormality has occurred in communication between the first and second microcomputers 301, 302 (S10: NO), and the series of processes illustrated in FIG. 3 is terminated.

In this case, the CPU 322 determines in S24 of FIG. 3 that communication between the first microcomputer 301 and the second microcomputer 302 is not normal (S24: NO), and the routine proceeds to S34. In the second operation signal generation process M442, the operation signal MS2 for operating the second inverter 222 is generated and output such that a q-axis current flowing through the second stator coil 142 becomes "½" of the second manipulated variable MV2.

Figure 4:
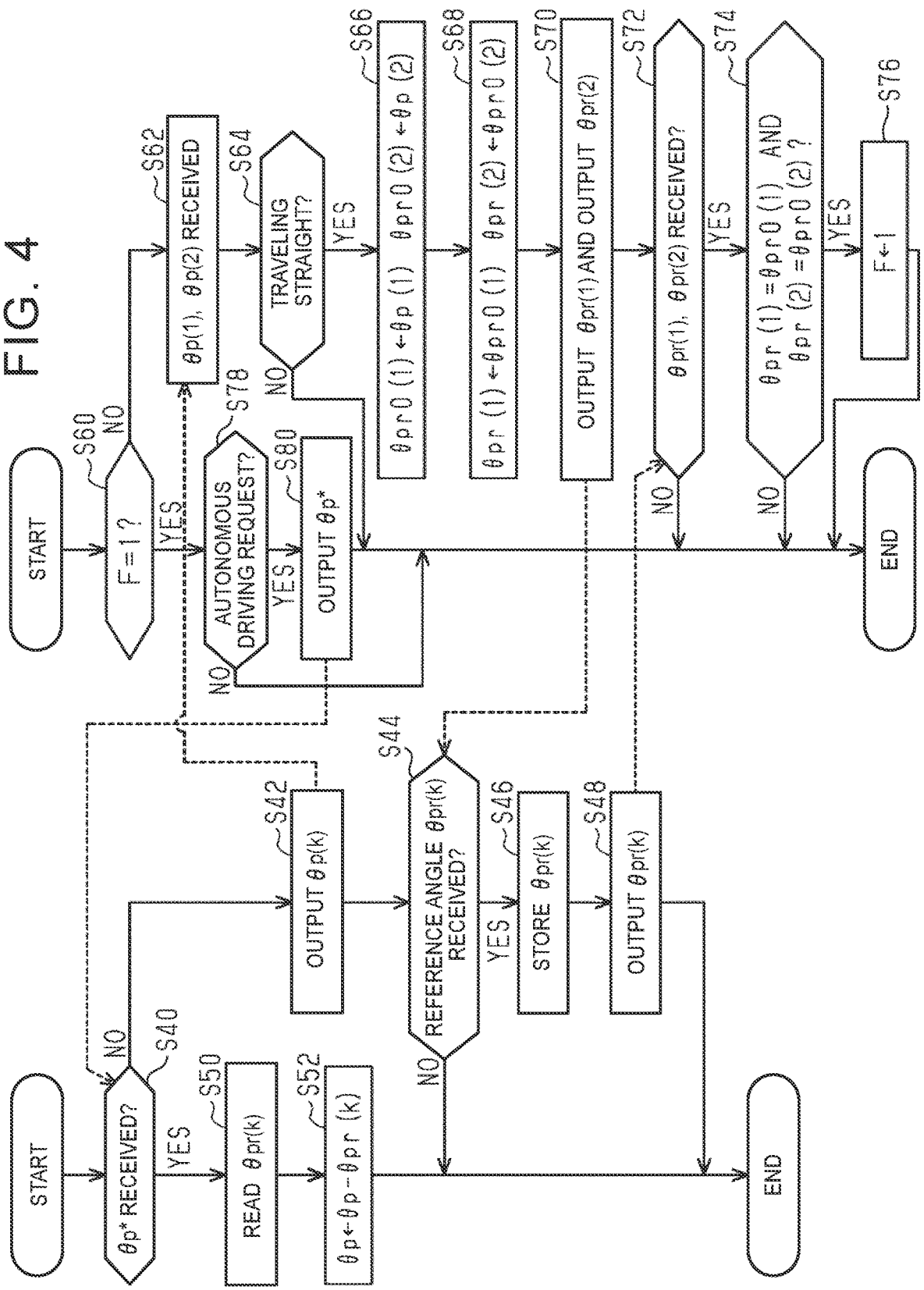
FIG. 4 is a flowchart illustrating processes that are executed by the control system.

Next, a process of setting the reference angle, which is the rotation angle θp(k) at which the vehicle travels straight, to zero will be described. FIG. 4 illustrates a process of learning the reference angle according to the present embodiment. The process illustrated in FIG. 4 is implemented by the CPU 32k repeatedly executing a program stored in the ROM 34k at, for example, predetermined intervals. The process illustrated in FIG. 4 is also implemented by the CPU 62 repeatedly executing a program stored in the ROM 64 at, for example, predetermined intervals.

In the series of processes illustrated in FIG. 4, the CPU 32k first determines whether the CPU 32k has received the target angle θp* or not (S40). When the CPU 32k determines that the CPU 32k has not received the target angle θp* (S40: NO), the CPU 32k outputs the rotation angle θp(k) to the upper ECU 60 via the communication line 50 (S42).

In the series of processes illustrated in FIG. 4, the CPU 62 first determines whether a flag F is "1" or not (S60). When the flag F is "1," it indicates that learning of the reference angle has been completed and that an autonomous steering process may be executed. When the flag F is "0," it indicates that learning of the reference angle has not been completed and that the autonomous steering process may not be executed. When the CPU 62 determines that the flag F is "0" (S60: NO), the CPU 62 receives the rotation angle θp(1) from the first microcomputer 301 and receives the rotation angle θp(2) from the second microcomputer 302 (S62). The CPU 62 then determines whether the vehicle is traveling straight or not (S64). In S64, the CPU 62 determines whether the vehicle is traveling straight or not based on the yaw rate γ, the lateral acceleration ay, etc.

When the CPU 62 determines that the vehicle is traveling straight (S64: YES), the CPU 62 substitutes the rotation angle θp(1) received in S62 for a reference angle θpr0(1) and substitutes the rotation angle θp(2) received in S62 for a reference angle θpr0(2) (S66). The CPU 62 then substitutes the reference angle θpr0(1) for a reference angle θpr(1) and substitutes the reference angle θpr0(2) for a reference angle θpr(2) (S68). Subsequently, the CPU 62 outputs the reference angle θpr(1) to the first microcomputer 301 via the communication line 50 and outputs the reference angle θpr(2) to the second microcomputer 302 via the communication line 50 (S70).

As shown in FIG. 4, the CPU 32k waits until the CPU 32k receives the reference angle θpr(k) (S44: NO). When the CPU 32k receives the reference angle θpr(k) (S44: YES), it stores the reference θpr(k) in the storage device 36k (S46). The CPU 32k then outputs the same value as the stored reference angle θpr(k) to the upper ECU 60 via the communication line 50 (S48).

As shown in FIG. 4, the CPU 62 waits until the CPU 62 receives the reference angles θpr(1), θpr(2) (S72: NO). When the CPU 62 receives the reference angles θpr(1), θpr(2) (S72: YES), it determines whether or not the logical product of "the received reference angle 441) matches the reference angles θpr0(1)" and "the received reference angle θpr(2) matches the reference angles θpr0(2)" is true (S74). When the CPU 62 determines that the logical product is true (S74: YES), the CPU 62 sets the flag F to "1" (S76).

When the CPU 62 determines that flag F is "1" (S60: YES), the CPU 62 determines whether there is an autonomous driving request or not based on the operation state of the autonomous driving switch 74 (S78). When the CPU 62 determines that there is an autonomous driving request (S78: YES), the CPU 62 calculates the target angle θp* and outputs the calculated target angle θp* to the first microcomputer 301 and the second microcomputer 302 via the communication line 50 (S80). The target angle θp* that is output to the first microcomputer 301 and the target angle θp* that is output to the second microcomputer 302 are the same angle.

As shown in FIG. 4, when the CPU 32k receives the target angle θp* (S40: YES), the CPU 32k reads the reference angle θpr(k) stored in the storage device 36k (S50). The CPU 32k then substitutes a value obtained by subtracting the reference angle θpr(k) from the rotation angle θp(k) for the rotation angle θp(k) that is to be input to the feedback manipulated variable calculation process M20k (S52).

When the process of S48 or S52 is completed or when the determination result in S44 is NO, the CPU 32k terminates the series of processes illustrated in FIG. 4. When the process of S76 or S80 is completed or when the determination result in S64, S72, S74, or S78 is NO, the CPU 62 terminates the series of processes illustrated in FIG. 4.

Functions and effects of the present embodiment will be described. Every time the rotation angle θp(k) is calculated before learning of the reference angle θpr(k), the CPU 32k outputs the calculated rotation angle θp(k) to the upper ECU 60. When the vehicle is traveling straight, the CPU 62 determines that the rotation angle θp(k) output from the kth microcomputer 30k corresponds to the reference angle, and substitutes the rotation angle θp(k) for the reference angles θpr(k), θpr0(k). The CPU 62 then outputs the reference angle θpr(k) to the kth microcomputer 30k. Accordingly, the first microcomputer 301 has the reference angle 441), and the second microcomputer 302 has the reference angle θpr(2). Since each of the first microcomputer 301 and the second microcomputer 302 separately has the reference angle, the difference between the angle to be used for control by the first microcomputer 301 and the angle to be used for control by the second microcomputer 302 is reduced.

The above embodiment further has the following functions and effects. When the CPU 32k receives the reference angle θpr(k), the CPU 32k outputs the received reference angle θpr(k) to the upper ECU 60. When the reference angle 441) output from the first microcomputer 301 is equal to the reference angle θpr0(1) and the reference angle 442) output from the second microcomputer 302 is equal to the reference angle θpr0(2), the CPU 62 permits autonomous steering. Autonomous steering is thus performed after it is confirmed that each of the first microcomputer 301 and the second microcomputer 302 has a correct angle.

In a normal state, the CPU 321 calculates the first manipulated variable MV1 for controlling the rotation angle θp(1) to the target angle θp* and operates the first inverter 221 such that a q-axis current flowing through the first stator coil 141 becomes "½" of the first manipulated variable MV1. The CPU 322 operates the second inverter 222 such that a q-axis current flowing through the second stator coil 142 becomes "½" of the first manipulated variable MV1. Interference in controlling the steered angle of the steered wheels is thus less likely to occur as compared to the case where the q-axis current flowing through the second stator coil 142 is controlled to the second manipulated variable MV2 that is calculated when the integration process M282 is performed.

That is, the rotation angle θp(1) corrected by the CPU 321 in S52 is controlled to the target angle θp*. When the target angle θp* that is output in S80 is the reference angle, the CPU 321 controls the actual angle to the reference angle. Moreover, the rotation angle θp(2) corrected by the CPU 322 in S52 is controlled to the target angle θp*. When the target angle θp* that is output in S80 is the reference angle, the CPU 322 controls the actual angle to the reference angle. Accordingly, when the target angle θp* that is output in S80 is the reference angle, the CPU 321 and the CPU 322 control the steered angle to the reference angle. However, unless the target angle θp* is the reference angle or an angle that is different from the reference angle by an integral multiple of a predetermined angle, the CPU 321 and the CPU 322 may control the steered angle to different angles due to distortion of the rotor 12. This is because, when the target angle θp* is not the reference angle etc., an actual steered angle corresponding to the rotation angle θp(1) corrected by the CPU 321 in S52 and an actual steered angle corresponding to the rotation angle θp(2) corrected by the CPU 322 in S52 may be different from each other due to the distortion of the rotor 12. The output value of the integration process M281 is a value for eliminating a steady-state deviation between the rotation angle θp(1) corrected by the CPU 321 in S52 and the target angle θp*, and the output value of the integration process M282 is a value for eliminating a steady-state deviation between the rotation angle θp(2) corrected by the CPU 322 in S52 and the target angle θp*. Accordingly, interference in control occurs when the actual steered angle corresponding to the rotation angle θp(1) corrected by the CPU 321 in S52 and the actual steered angle corresponding to the rotation angle θp(2) corrected by the CPU 322 in S52 are different from each other.

In the case where an abnormality of which cause cannot be identified by the first microcomputer 301 occurs in control, the CPU 322 detects the abnormality as the absolute value of the difference between the first manipulated variable MV1 and the second manipulated variable MV2 is equal to or larger than the prescribed value Mth. In this case, the CPU 322 uses the second manipulated variable MV2 to operate the second inverter 222. This reduces contribution of the first manipulated variable MV1 to the control to the target angle θp* as compared to the case where the first manipulated variable MV1 is used to operate the second inverter 222 even when the first manipulated variable MV1 is abnormal. In this case, the CPU 322 calculates the second manipulated variable MV2 with the integration process M282 being stopped. This avoids interference in control which occurs due to the output values of the integration processes M281, M282 being values that eliminate steady-state deviations different from each other.

When communication between the first microcomputer 301 and the second microcomputer 302 is abnormal, the CPU 322 uses the second manipulated variable MV2 to operate the second inverter 222. Accordingly, the q-axis current flowing through the first stator coil 141 is controlled to "½" of the first manipulated variable MV1, and the q-axis current flowing through the second stator coil 142 is controlled to "½" of the second manipulated variable MV2. Torque of the motor 10 is thus controlled to a value appropriate for control to the target angle θp*. In this case, the CPU 322 calculates the second manipulated variable MV2 with the integration process M282 being stopped. This avoids interference in control which occurs due to the output values of the integration processes M281, M282 being values that eliminate steady-state deviations different from each other.

The correspondence between the matters described in the above embodiment and the matters described in the above "SUMMARY" is as follows. The kth drive circuit corresponds to the kth inverter 22k, and the kth processing circuit corresponds to the kth microcomputer 30k, where the variable k is "1" or "2." The command circuit corresponds to the upper ECU 60. The detection process corresponds to the process of S64, the first notification process corresponds to the process of outputting the reference angle 441) in the process of S70, and the second notification process corresponds to the process of outputting the reference angle θpr(2) in the process of S70. The first correction process corresponds to the process of making a correction using the reference angle θpr(1) in the process of S52, and the second correction process corresponds to the process of making a correction using the reference angle θpr(2) in the process of S52. The first output process corresponds to the process of S42 that is executed by the CPU 321, and the first comparison output process corresponds to the process of S48 that is executed by the CPU 321. The second output process corresponds to the process of S42 that is executed by the CPU 322, and the second comparison output process corresponds to the process of S48 that is executed by the CPU 322. The first comparison process corresponds to the process of determining whether the reference angle θpr0(1) matches the reference angle 441) in the process of S74. The second comparison process corresponds to the process of determining whether the reference angle θpr0(2) matches the reference angle θpr(2) in the process of S74. The kth manipulated variable calculation process corresponds to the feedback manipulated variable calculation process M20k, the feedforward manipulated variable calculation process M40k, and the addition process M42k. The manipulated variable output process corresponds to the process of S14. A first use and operation process corresponds to the second operation signal generation process M442 that is executed when the process of S30 is executed. The determination process corresponds to the process of S28. The second use and operation process corresponds to the second operation signal generation process M442 that is executed when the process of S34 is executed.

At least one of the matters of the above embodiment may be modified as follows. In the above embodiment, the reference angle θpr(k) is output to the kth microcomputer 30k. However, the disclosure is not limited to this. For example, when the determination result in S64 is YES, a signal indicating this determination result may be output as a kth result signal to the kth microcomputer 30k. In this case, the kth microcomputer 30k substitutes the rotation angle θp(k) at the time of receiving the kth result signal for the reference angle θpr(k). Even in this case, it is desirable that, after the CPU 62 executes the process of S68 and the CPU 32k substitutes the rotation angle θp(k) at the time of receiving the kth result signal for the reference angle θpr(k), the CPU 32k outputs the resultant value in S48. The process of S74 can thus be executed.

In the process of S42, a time stamp indicating the time when the rotation angle θp(k) is detected may be output together with the rotation angle θp(k). The CPU 62 thus more accurately obtains the rotation angle θp(k) corresponding to the timing at which the CPU 62 determines in S64 that the vehicle is traveling straight.

In the above embodiment, the rotation angle θp(k) to be input to the feedback manipulated variable calculation process M20k is corrected. However, the disclosure is not limited to this. For example, the target angle θp* to be input to the feedback manipulated variable calculation process M20k may be corrected. Even in this case, the relative angle between the target angle θp* output in S80 and the rotation angle θp(k) output by the conversion process M12k may be corrected. A value to be corrected is not limited to the input to the feedback manipulated variable calculation process M20k. For example, when the feedforward manipulated variable MFFk is calculated based the rotation angle θp(k), the rotation angle θp(k) to be input to the feedforward manipulated variable calculation process M40k is also corrected.

For example, in the case where the integral gain Ki for the feedback manipulated variable MFBk is not variable, the integral element may be a process of multiplying the output value of the integration process M28k by the integral gain Ki in the integral gain multiplication process M26k.

The feedback manipulated variable MFBk is not limited to the sum of the output values of the proportional element M24k, the integral element, and the differential element. For example, the feedback manipulated variable MFBk may be the sum of the output values of the proportional element and the integral element, may be the sum of the output values of the integral element and the differential element, or may be the output value of the integral element.

Regarding the feedforward manipulated variable MFFk, the feedforward manipulated variable MFFk based on the convertible angle (the target angle θp* etc.) is not limited to the feedforward manipulated variable MFFk calculated from only the convertible angle. For example, the feedforward manipulated variable MFFk may be variable according to the vehicle speed. For example, a second-order time differential value of the convertible angle multiplied by a proportional coefficient may further be added to calculate the feedforward manipulated variable MFFk.

It is not essential to calculate the kth manipulated variable MVk based on the feedforward manipulated variable MFFk.

In the above embodiment, the convertible angle is the angle of the steering shaft. However, the disclosure is not limited to this. The convertible angle may be the steered angle that is the turning angle of the tires.

In the above embodiment, the ROM is illustrated as a program storage device that forms the processing circuit, but the type of ROM is not mentioned in the above description. The ROM may be a non-rewritable memory or may be an electrically rewritable nonvolatile memory. The program storage device is not limited to the ROM.

The processing circuit is not limited to a software processing circuit including a program storage device storing a program therein and a CPU for executing the program. The processing circuit may be a dedicated hardware circuit for executing a predetermined process, such as an application specific integrated circuit (ASIC).

The processing circuit is not limited to a processing circuit formed by either the software processing circuit or the dedicated hardware circuit. The processing circuit may execute a part of the above processes by the software processing circuit and execute the remainder of the above processes by the dedicated hardware circuit.

The above embodiment illustrates a device having two systems, namely the first system and the second system. However, the disclosure is not limited to this. For example, the device may further include a third system etc. Specifically, the device may include three or more stator coils, three or more drive circuits, and three or more processing circuits. In this case, it is desirable that one of the three or more components be used as a main component and the remainder be used as sub-components.

The motor is not limited to the SPMSM. The motor may be an interior permanent magnet synchronous motor (IPMSM). In the case of the IPMSM, it is desirable that the kth manipulated variable MVk be a torque command value and that the torque command value be converted to a d-axis current command value and a q-axis current command value in the kth operation signal generation process M44k. The motor is not limited to the synchronous motor but may be an induction motor. The motor is not limited to the brushless motor but may be a brushed DC motor.

In the above embodiment, the three-phase inverter is illustrated as the drive circuit. However, the disclosure is not limited to this. For example, when a DC motor is used as the motor, an H-bridge circuit may be used as the drive circuit.

OTHERS

It is not essential to provide the relays 261, 262 and to turn off the relay 261 in S18. In S18, the relay 261 may be turned off and the relay 241 may not be turned off

What is claimed is:

1. A control system for a motor, the motor being configured to steer a steered wheel and including a first stator coil and a second stator coil that are insulated from each other, the control system comprising:
   a first processing circuit configured to operate a first drive circuit connected to the first stator coil;
   a second processing circuit configured to operate a second drive circuit connected to the second stator coil; and
   a command circuit configured to output a signal relating to a command value for a steered angle of the steered wheel to the first processing circuit and the second processing circuit, wherein
   the command circuit is configured to execute a detection process, a first notification process, and a second notification process, the detection process being configured to detect, based on a traveling state of a vehicle, when the steered angle becomes a reference angle, the first notification process being configured to output a first result signal, which is a signal based on a detection result of the detection process, to the first processing circuit, and the second notification process being configured to output a second result signal, which is a signal based on the detection result of the detection process, to the second processing circuit,
   the first processing circuit is configured to execute a first correction process based on the first result signal to control the steered angle to the command value, the first correction process being a process of correcting a relative angle between a first convertible angle, which is a convertible angle that is convertible to the steered angle of the steered wheel, and a convertible angle according to the command value to input the corrected relative angle to operate the first drive circuit, and the first convertible angle being an angle based on a detection value of a first angle sensor, and
   the second processing circuit is configured to execute a second correction process based on the second result signal to control the steered angle to the command value, the second correction process being a process of correcting a relative angle between a second convertible angle and the convertible angle according to the command value to input the corrected relative angle to operate the second drive circuit, and the second convertible angle being an angle based on a detection value of a second angle sensor.

2. The control system for the motor according to claim 1, wherein
   the first processing circuit is configured to execute a first output process and a first comparison output process, the first output process being a process of outputting the first convertible angle to the command circuit, the first comparison output process being a process of outputting a reference first angle to the command circuit, and the reference first angle being a value when the first convertible angle output by the first output process based on the first result signal indicates the reference angle,
   the second processing circuit is configured to execute a second output process and a second comparison output process, the second output process being a process of outputting the second convertible angle to the command circuit, the second comparison output process being a process of outputting a reference second angle to the command circuit, and the reference second angle being a value when the second convertible angle output by the second output process based on the second result signal indicates the reference angle, and
   the command circuit is configured to execute a first comparison process and a second comparison process, the first comparison process being a process of checking whether or not the value when the first convertible angle output by the first output process, which is obtained based on the detection process, indicates the reference angle matches the reference first angle output by the first comparison output process, and the second comparison process being a process of checking whether or not the value when the second convertible angle output by the second output process, which is obtained based on the detection process, indicates the reference angle matches the reference second angle output by the second comparison output process.

3. The control system of the motor according to claim 2, wherein
the first notification process includes a process of outputting, as the first result signal, to the first processing circuit a signal relating to the first convertible angle when the steered angle becoming the reference angle is detected by the detection process based on the first convertible angle output by the first output process,
the first comparison output process includes a process of outputting, as the reference first angle, the first convertible angle notified by the first notification process,
the second notification process includes a process of outputting, as the second result signal, to the second processing circuit a signal relating to the second convertible angle when the steered angle becoming the reference angle is detected by the detection process based on the second convertible angle output by the second output process, and
the second comparison output process includes a process of outputting, as the reference second angle, the second convertible angle notified by the second notification process.

4. The control system for the motor according to claim 1, wherein
the first processing circuit is configured to execute a first manipulated variable calculation process of calculating a first manipulated variable based on an output value of an integral element according to a difference between the first convertible angle and a target angle according to the command value, a process of operating the first drive circuit based on the first manipulated variable, and a manipulated variable output process of outputting the first manipulated variable to the second processing circuit, and
the second processing circuit is configured to execute a second manipulated variable calculation process of calculating a second manipulated variable, without using an integral element, according to a difference between the second convertible angle and the target angle, a first use and operation process of operating the second drive circuit based on the first manipulated variable, and a determination process of determining during the first use and operation process whether the first processing circuit is abnormal or not based on a deviation between the first manipulated variable and the second manipulated variable calculated by the second manipulated variable calculation process.

5. The control system for the motor according to claim 4, wherein
the second processing circuit is configured to stop the first use and operation process and execute a second use and operation process of operating the second drive circuit based on the second manipulated variable, when it is determined in the determination process that the first processing circuit is abnormal.

6. A control device for a motor, the motor being configured to steer a steered wheel and including a first stator coil and a second stator coil that are insulated from each other, the control device comprising:
a first processing circuit configured to operate a first drive circuit connected to the first stator coil; and
a second processing circuit configured to operate a second drive circuit connected to the second stator coil, wherein
the first processing circuit is configured to execute a first correction process based on a first result signal received from a command circuit to control a steered angle to a command value, the first result signal being a signal according to a result of detection of the steered angle becoming a reference angle that is performed based on a traveling state of a vehicle,
the first correction process is a process of correcting a relative angle between a first convertible angle, which is a convertible angle that is convertible to the steered angle of the steered wheel, and a convertible angle according to the command value to input the corrected relative angle to operate the first drive circuit, and the first convertible angle being an angle based on a detection value of a first angle sensor, and
the second processing circuit is configured to execute a second correction process based on a second result signal received from the command circuit to control the steered angle to the command value, the second result signal being a signal according to the result of detection of the steered angle becoming the reference angle that is performed based on the traveling state of the vehicle, and
the second correction process is a process of correcting a relative angle between a second convertible angle and the convertible angle according to the command value to input the corrected relative angle to operate the second drive circuit, and the second convertible angle being an angle based on a detection value of a second angle sensor.

* * * * *